No. 12,220. REISSUED MAY 17, 1904.
R. MEYER.
APPARATUS FOR SINGEING HOSIERY.
APPLICATION FILED FEB. 14, 1901.
4 SHEETS—SHEET 1.
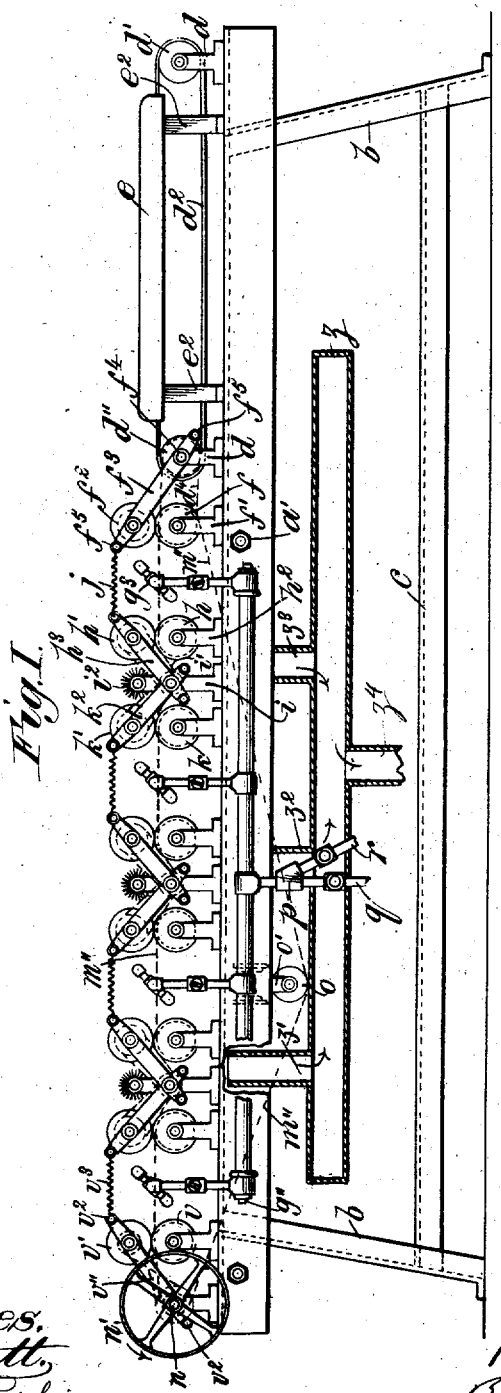
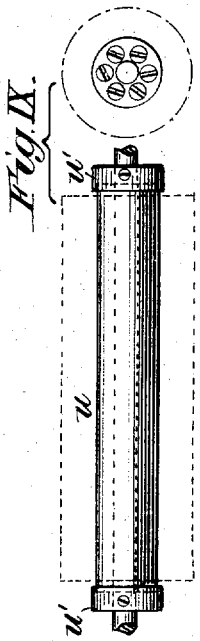
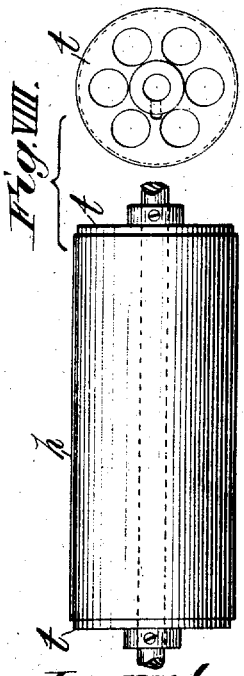
Witnesses.
Robert Everett,
Albert Popkins
Inventor:
Robert Meyer
By Percy B. Hills
Atty.

No. 12,220. REISSUED MAY 17, 1904.
R. MEYER.
APPARATUS FOR SINGEING HOSIERY.
APPLICATION FILED FEB. 14, 1901.
4 SHEETS—SHEET 2.
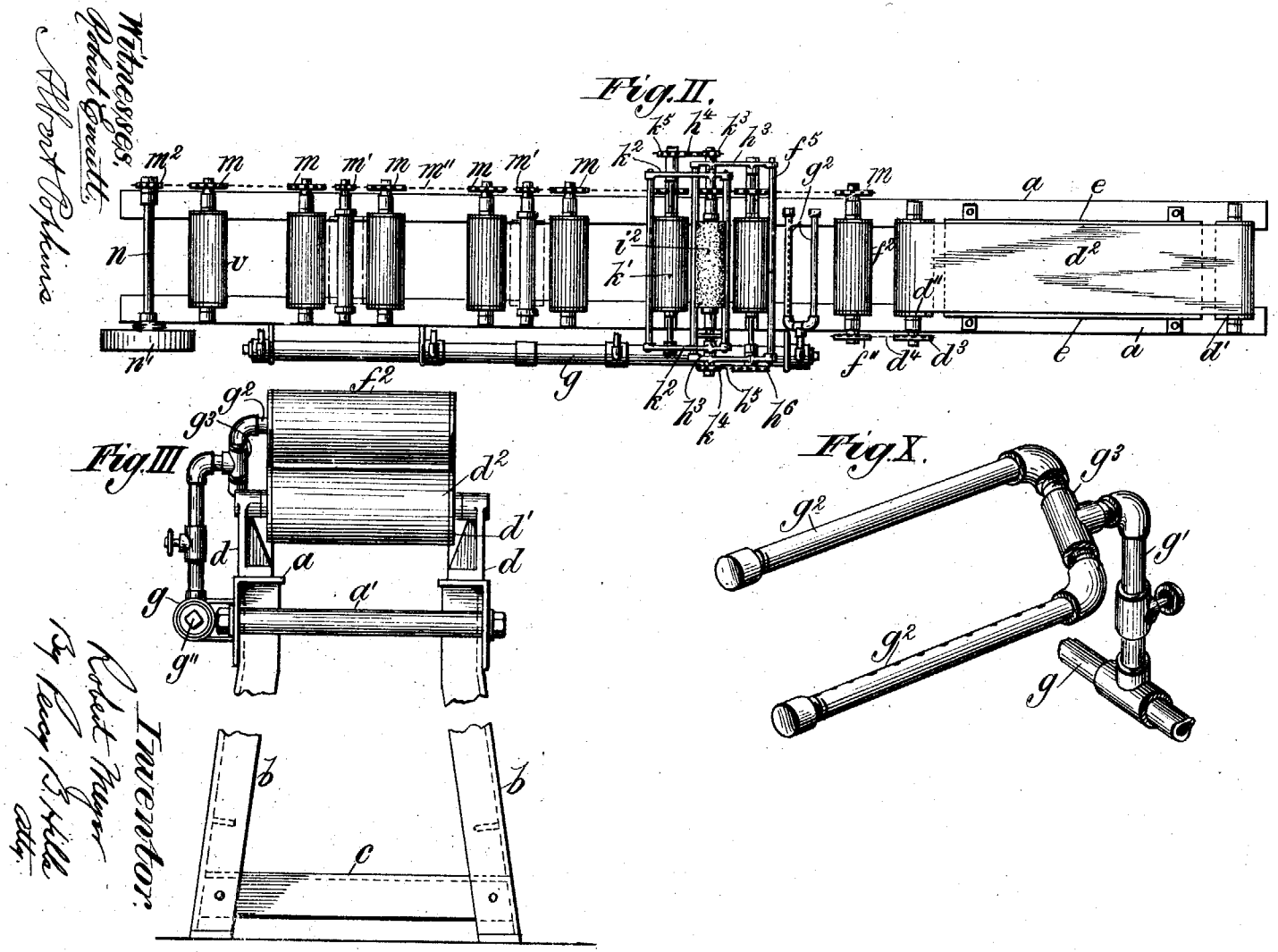

No. 12,220. REISSUED MAY 17, 1904.
R. MEYER.
APPARATUS FOR SINGEING HOSIERY.
APPLICATION FILED FEB. 14, 1901.
4 SHEETS—SHEET 3.
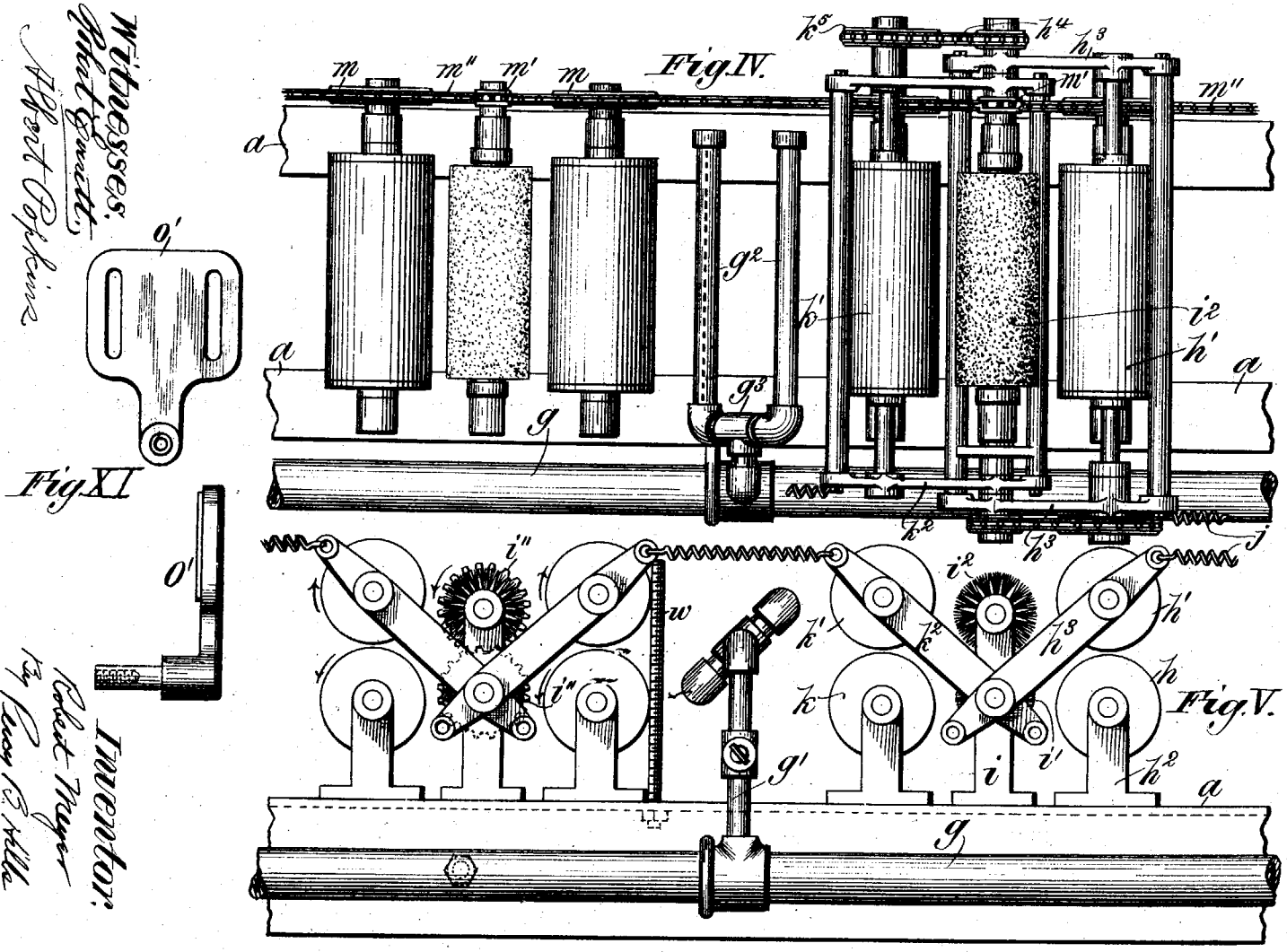
Witnesses.
Robt Everett,
Albert Popkins
Inventor.
Robert Meyer
By Percy B. Hills
Atty.

No. 12,220. REISSUED MAY 17, 1904.
R. MEYER.
APPARATUS FOR SINGEING HOSIERY.
APPLICATION FILED FEB. 14, 1901.
4 SHEETS—SHEET 4.
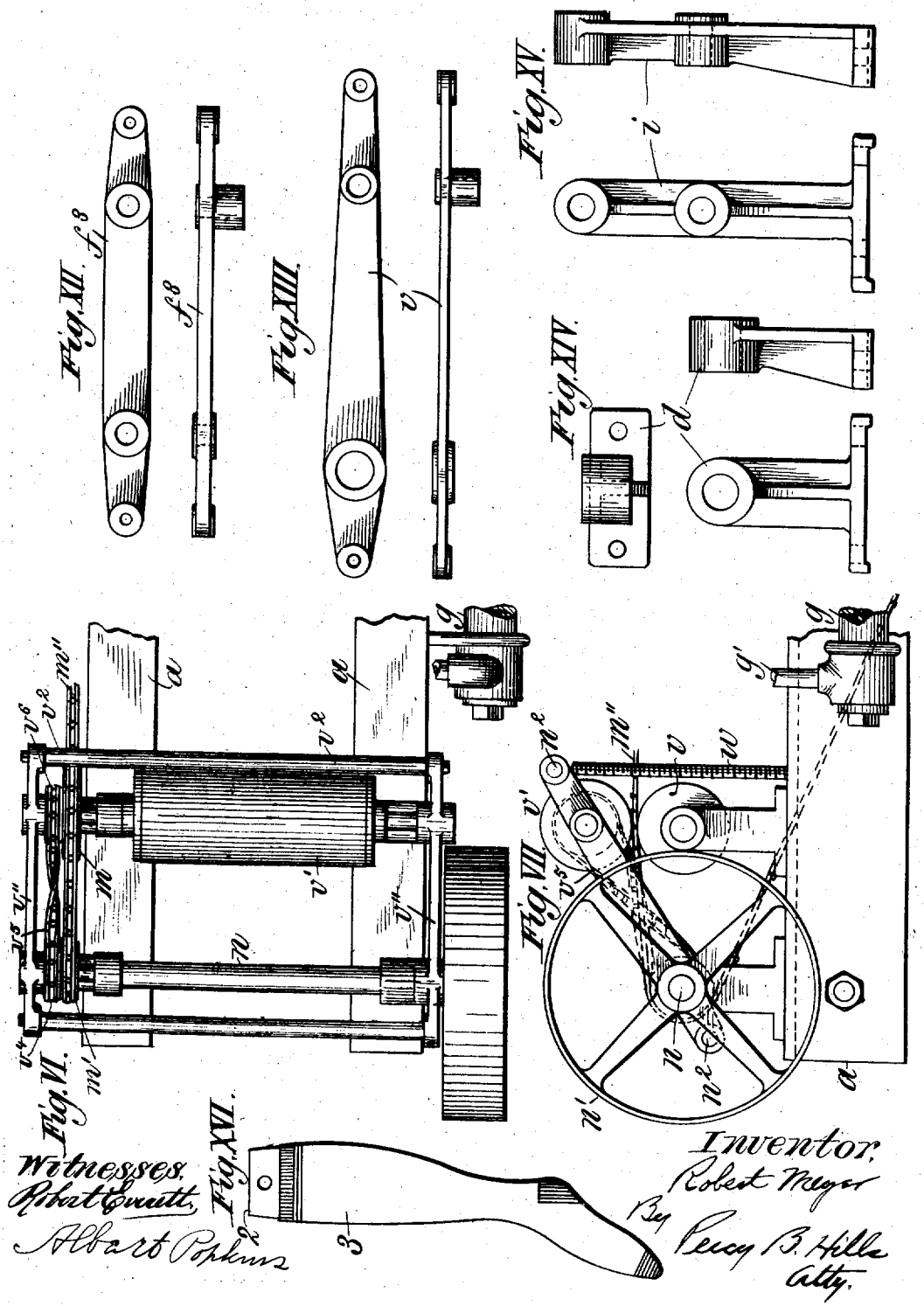

No. 12,220. Reissued May 17, 1904.

UNITED STATES PATENT OFFICE.

ROBERT MEYER, OF PHILADELPHIA, PENNSYLVANIA, ASSIGNOR, BY MESNE ASSIGNMENTS, TO SAID MEYER, WILLIAM C. FOULDS, AND ROBERT BLOOD, OF PHILADELPHIA, PENNSYLVANIA, AND PERCY B. HILLS, OF WASHINGTON, DISTRICT OF COLUMBIA.

APPARATUS FOR SINGEING HOSIERY.

SPECIFICATION forming part of Reissued Letters Patent No. 12,220, dated May 17, 1904.

Original No. 641,528, dated January 16, 1900. Application for reissue filed February 14, 1901. Serial No. 47,370.

*To all whom it may concern:*

Be it known that I, ROBERT MEYER, a citizen of the United States, residing at Philadelphia, in the county of Philadelphia and State of Pennsylvania, have invented certain new and useful Improvements in Apparatus for Singeing Hosiery; and I do hereby declare the following to be a full, clear, and exact description of the invention, such as will enable others skilled in the art to which it appertains to make and use the same.

My invention relates to the treatment of hosiery, and has for its object to provide an apparatus for singeing the same embodying certain novel details of construction and operation, as will be hereinafter more definitely pointed out and claimed, reference being had to the accompanying drawings, in which—

Figure I represents such apparatus in side elevation, the driving mechanism being conveniently indicated by broken lines because of the necessarily small scale. Fig. II shows the same in top plan view, a considerable number of parts being omitted because merely duplications of others shown. Fig. III represents this apparatus in end elevation as viewed from the right-hand end of Fig. II or Fig. I. Fig. IV shows a top plan view, on an enlarged scale, of a portion of the apparatus. Fig. V represents the same in side elevation. Fig. VI shows a top plan view of another portion of the apparatus on an enlarged scale. Fig. VII represents the same in side elevation. Fig. VIII represents one of the feed-rollers in side elevation, together with a face view of one head of the same. Fig. IX shows similar views of one of the rotary brush-rolls. Fig. X represents one of the duplex burners in perspective. Fig. XI shows face and side edge views of a roller-supporting bracket. Fig. XII shows face and side edge views of a roller-supporting arm. Fig. XIII shows similar views of a similar arm. Fig. XIV shows top, face, and side edge views of a feed-roller-supporting standard. Fig. XV shows face and side edge views of a brush-supporting standard. Fig. XVI shows one of the boarded stockings as it is passed through the machine.

The supporting-framework of the apparatus comprises two bed-plates $a$, L-shaped in cross-section and of considerable length, said plates being connected together by tie-bolts $a'$ and supported at a suitable elevation by inclined uprights $b$, between which extend longitudinal and transverse brace-bars $c$. Standards $d$, erected upon the bed-plates $a$ at one end of the machine, support a pair of rollers $d'$ $d''$, over which runs an endless apron $d^2$, whose upper stretch receives the goods to be treated, this apron being so operated as to keep its upper stretch moving constantly toward the discharge end of the machine. In order to prevent displacement of the goods after they have been deposited upon the apron, I set on edge at each side of the latter an elongated guard-plate $e$, which extends along and rises above the upper stretch of the apron, being supported by suitable uprights $e^2$, erected on the bed-plates $a$.

A short distance beyond the apron-roller $d''$ a feed-roller $f$ is supported in standards $f'$, erected on the bed-plates $a$, said feed-roller being geared to the apron-supporting roller $d''$, so as to rotate in the same direction therewith, by means of sprocket-wheels $d^3$ and $f''$ on the journals of these two rollers and around which passes a chain, (conventionally indicated in Fig. II by the broken line $d^4$.) Another feed-roller $f^2$ is arranged immediately above the feed-roller $f$ and is journaled in bearings formed on a pair of arms $f^3$, which are pivotally mounted upon the journals of the apron-supporting roller $d''$, as shown at $f^4$, these two arms being connected by tie-rods $f^5$, extending between their upper and lower ends.

A main gas-pipe $g$ extends alongside one of the bed-plates $a$, and a branch pipe $g'$ rises from a suitable union at one end of the same and is connected by an elbow with the stem of a duplex burner, consisting of two lengths of pipe $g^2$, perforated in the confronting sides and connected by elbows and screw-threaded nipples with an obliquely-set T-shaped union $g^3$, with which the above-mentioned stem connects. This burner is located a short distance beyond the feed-rollers $f$ $f^2$, and is so arranged that its members $g^2$ have position above and below the path of the goods moved forward by said feed-rollers, so as to direct gas-jets against both sides of the goods. Beyond this duplex burner another pair of feed-rollers $h$ and $h'$ are located, the lower one being journaled in standards $h^2$, erected on the bed-plates $a$, and the upper one being journaled in bearings formed upon a pair of arms $h^3$, similar to the previously-described arms $f^3$ and connected together by tie-rods, as are the latter. Standards $i$ are erected on the bed-plates $a$ just beyond the standards $h^2$ and are formed with bearings for a pair of rotary brushes $i'$ and $i^2$, whose journals carry intermeshing cog-wheels $i''$, Fig. V, and the journals of the lower one of which constitute pivots for the arms $h^3$. The latter and the arms $f^3$ are connected together at their upper ends by spiral springs $j$, which exert themselves to press the rollers $f^2$ and $h'$ toward the rollers $f$ and $h$ for the purpose of insuring the desired feeding action of the rollers upon the goods under treatment. A third pair of feed-rollers $k$ and $k'$ are arranged beyond the rotary brushes $i'$ and $i^2$, the upper one of said feed-rollers being journaled in arms $k^2$, which are pivoted upon the journals of the lower brush $i'$. The journals of this lower brush also carry a pair of sprocket-wheels $k^3$ and $k^4$, which are connected, respectively, by sprocket-chains $h^4$ and $h^5$ with sprocket-wheels $k^5$ and $k^6$, carried by the journals of the feed-rollers $k'$ and $h'$, through which connections said feed-rollers are driven in a direction to advance the goods.

The above-described arrangement of two pairs of feed-rollers, such as $h$ $h'$ and $k$ $k'$, with a pair of rotary brushes, such as $i'$ $i^2$, between them is duplicated as many times as found desirable in the apparatus, the duplex burner being correspondingly duplicated, and in the present instance I have shown two duplications of such arrangement, so that the goods will be three times singed and brushed in passing through the apparatus.

In the construction of parts to make up an apparatus such as here shown provision is made for ready conformity to any requirements as to the extent of treatment to which goods should be subjected. The gas-pipe $g$ is made up of sections united by unions from which the branches $g'$ extend, and of course any number of such sections can be coupled together with a burner branch at each union, plugs $g''$ being inserted in the end unions. The sets of feed-rollers can be duplicated as many times as desirable, a pair of rotary brushes being arranged between the pairs of rollers of each set. By reason of this duplication of parts it happens that a burner appears in the drawings beyond the last double set of feed-rollers; but this burner is used only when the apparatus is extended by the addition of more sets of feed-rollers and more sections of gas-pipe. There is, however, one additional pair of feed-rollers $v$ $v'$, which delivers the goods, the upper one of these rollers being journaled in arms $v''$, pivoted on the driving-shaft $n$ and connected by tie-rods $v^2$, and also joined to similar arms of the last set of feed-rollers by spiral springs $v^3$.

Each of the lower feed-rollers has a sprocket-wheel $m$ affixed to its journal, and each of the lower brushes has a sprocket-wheel $m'$ affixed to its journal, and a sprocket-chain passes over each of the feed-roller sprocket-wheels and under each of the brush sprocket-wheels, said sprocket-chain being indicated conventionally in Figs. I and II by the broken line $m''$ and designated by the same reference symbol in other figures, where the parts appear on a larger scale. At the left-hand end of the machine the driving-shaft $n$ is journaled in suitable standards erected on the bed-plates $a$, and this shaft carries a sprocket-wheel $m^2$, around which the chain $m''$ passes, said chain thence running to and passing around the sprocket-wheel $m$ on the journal of the first lower feed-roller $f$. A roller or pulley $o$ is supported by a bracket $o'$, depending from one of the bed-plates $a$ and adjustably secured thereto, said roller or pulley engaging the lower stretch of the chain $m''$ to hold the same taut, the adjustment providing for taking up slack in the chain. A sprocket-wheel $v^4$, Fig. VI, on said driving-shaft is connected by a crossed chain $v^5$ with a sprocket-wheel $v^6$ on the journal of the roller $v'$.

The driving-shaft $n$ carries a pulley $n'$, to which any suitable motor may be connected, and it will be seen that when driven in the direction of the arrow shown in Fig. I this pulley will impart motion to all of the lower feed-rollers in the same direction and to all of the lower brushes in the opposite direction, whereby said rollers are caused to advance the goods through the machine, while the brushes operate upon the goods in an opposite direction to that in which they are moving.

The several duplex burners are all connected by branch pipes with the main pipe $g$, and the latter is connected by a short pipe-section with a head $p$, into which gas and air pipes $q$ and $r$ enter, the object being to supply the burners with a Bunsen flame.

In operation the stockings having been stretched over the boards are placed upon the upper stretch of the feed-apron $d^2$ and by the latter advanced between the first pair of feed-rollers, which carry them on between the members of the first duplex burner, where all sides are subjected to the action of the Bunsen flames issuing through the perforations in said burner members. The goods are taken by the next set of feed-rollers before being released by the first set, so that there is no danger of their dropping in the space between the two sets of rollers, and by this second set of feed-rollers the goods are passed between the brushes $i'$ and $i^2$, each rotating in a reverse direction to the feed-rollers, and they remove the singed lint and fuzz from the surface of the goods. Finally, after being several times singed and brushed the goods are discharged from the apparatus by the rollers $v$ and $v'$.

Each of the feed-rollers is preferably constructed of a cylinder of thin brass tubing and heads $t$, to which the same is secured and which are fastened to the journal, as shown in Fig. VIII.

In order to prevent the upper feed-roller of any pair from coming in contact with its mate, I may employ a screw-threaded rod $w$, such as shown in Figs. V and VII, this rod being adjustably secured in the bed-plate with its upper end constituting an abutment for one of the swinging arms, which support the upper roller.

Each of the rotary brushes comprises a wooden core $u$ and metal caps or heads $u'$, fastened to the same and to the journal, as shown in Fig. IX, the said wooden core carrying the bristles. The bristles of the last set of brushes which act on the goods are preferably somewhat softer than those of the other brushes, so as to simply remove singed matter without raising any fresh lint.

In Fig. XVI the reference-numeral 2 designates one of the forms, which consists of a thin wooden board so shaped as to fill out the stocking, causing the same to lie smoothly over it on all sides. The stocking is designated by the numeral 3, and it will be understood that the board is so thin that the flames readily reach those portions of the stocking lying over the edges as well as the portions stretched over the sides of the board, the burner-pipes, moreover, being of sufficient length to insure contact of the singeing flames all over the surface of the stocking. Of course the movement of the goods will be sufficiently rapid to prevent any injurious effects of the flames, and obviously no singeing action is had on the inside of the stocking, which is filled by the board.

By following the mode of procedure above described with apparatus of the character shown advantageous results are obtained in that the desired exterior finish is imparted to the goods by removal of lint and fuzz, while the interior is not affected, but is left with the desired soft surface. No injurious effects ensue such as heretofore experienced from the use of chemicals, for none are employed in carrying out my invention, the process being of a mechanical nature. Moreover, frictional action is not relied upon in any degree, so that no loss of weight or elasticity is experienced.

While the form of apparatus here shown is admirably adapted to the purpose in view, yet it is to be understood that the invention is susceptible of embodiment in other forms.

I have here shown associated with the machine an air-exhaust conduit $z$ extending horizontally below the bed-plates $a$ and having mouths $z'$ $z^2$ $z^3$, located below the spaces immediately in rear of the several pairs of rotary brushes, and also a centrally-located blower connection $z^4$, the object of this arrangement being to carry off the singed lint and fuzz as it is brushed from the goods.

Having thus fully described my invention, what I claim as new, and desire to secure by Letters Patent of the United States, is—

1. In an apparatus of the character described, the combination of feed-rollers arranged in a series of alining pairs between which the goods under treatment successively pass, means for continuously driving said feed-rollers to advance the goods, a burner located between two pairs of the feed-rollers and adapted to direct flames against the passing goods, and a brush located between one of said two pairs of feed-rollers and the adjacent pair in position to remove singed matter from the surface of the goods.

2. In an apparatus of the character described, the combination of feed-rollers arranged in a series of alining pairs between which the goods under treatment successively pass, means for continuously driving said feed-rollers to advance the goods, burners located between two pairs of the feed-rollers and on opposite sides of the path of movement of the goods, said burners adapted to direct flames against the latter, and brushes located on opposite sides of the path of movement of the goods between one of said two pairs of feed-rollers and the adjacent pair in position to remove singed matter from the surfaces of the goods, substantially as described.

3. In an apparatus of the character described, the combination of feed-rollers arranged in a series of alining pairs between which the goods under treatment successively pass, means for continuously driving said feed-rollers to advance the goods, burners located between two pairs of the feed-rollers and on opposite sides of the path of movement of the goods; said burners adapted to direct flames against the latter, a pair of rotary cylindrical brushes located between one of said two pairs of feed-rollers and the adjacent pair in alinement therewith, and means for driving said brushes oppositely to the feed-rollers.

4. In an apparatus of the character described, the combination of feed-rollers arranged in a series of alining pairs between which the goods under treatment successively pass, means for continuously driving said feed-rollers to advance the goods, one or more burners located between every other two adjacent pairs of feed-rollers, and one or more brushes located between the alternating two adjacent pairs of rollers, substantially as described.

5. An apparatus of the character described, the same comprising a horizontal feed-apron and supports, a horizontal series of vertically-paired feed-rollers, means for driving the feed-apron and feed-rollers continuously in directions to constantly advance goods placed on the apron and introduced between the rollers, burners located between certain pairs of the feed-rollers and arranged to direct flames against the passing goods as they are transferred between the said pairs of rollers, rotary brushes arranged in pairs between certain of the pairs of feed-rolls where the goods in passing from one of such pairs of feed-rolls to another must pass between the brushes, and means for rotating the latter oppositely to the feed-rollers, substantially as described.

6. In an apparatus of the character described, the combination of feed-rollers arranged in confronting pairs, concentrically-pivoted arms supporting the upper rollers of the pairs, tie-rods connecting the arms in pairs, means for continuously rotating the rollers in directions to advance the goods under treatment, brushes to act on the goods while passing between the pairs of rollers, and burners arranged to direct flames against the goods as they approach the rollers.

7. In an apparatus of the character described the combination of feed-rollers arranged in confronting pairs, pivoted arms supporting the upper rollers of the pairs, retractile springs connecting the arms, means for limiting the movement of the said upper rollers toward the lower rollers, means for driving the rollers so as to advance goods brought between them, burners for directing flames against the surface of the goods, and brushes to remove singed matter from the surface of the goods.

8. An apparatus of the character described the same comprising a horizontal series of vertically-paired feed-rollers, one roller of each pair movable toward and from the other, rotary brushes located between certain pairs of feed-rollers, burners in the form of pipes transversely arranged between certain other pairs of feed-rollers, a gas-conduit extending longitudinally of the machine and having branches to supply the burner, means for driving the feed-rollers in directions to advance the goods continuously and expose them to the flames of the burners, together with means for driving the brushes in opposition to the advance of the goods, substantially as and for the purpose described.

9. In a stocking-singeing machine, means for supporting the article from within, means for singeing the outside of said article, and means for brushing the surface of the article during its passage through the machine.

10. In a stocking-singeing machine, means for supporting the article from within, means for singeing the outside of said article, and means for removing singed matter from the surface of the article during its passage through the machine.

11. In a stocking-singeing machine, a former over which the stocking is stripped whereby it is supported from within, feed-rollers for conveying said former and stocking through the machine, means for singeing the stocking during its passage through the machine, and rotating brushes operating on said stocking during its passage through the machine.

12. In a stocking-singeing machine, a former over which the stocking is stripped whereby it is supported from within, feed-rollers for conveying said former and stocking through the machine, means for singeing the stocking during its passage through the machine, and reversely-rotating brushes operating on said stocking during its passage through the machine.

13. In a stocking-singeing machine, a former over which the stocking is stripped whereby it is supported from within, feed-rollers for conveying said former and stocking through the machine, means for singeing said stocking during its passage through the machine, and brushes operating on said stocking during its passage through the machine and rotating at variance with the feed-rollers.

In testimony whereof I affix my signature in presence of two witnesses.

ROBERT MEYER.

Witnesses:

LIZZIE SCHMIDT,

FRED. E. SCHMIDT.